F. R. WEATHERSBY.
DRILL.
APPLICATION FILED JUNE 16, 1913.
1,131,448.
Patented Mar. 9, 1915.
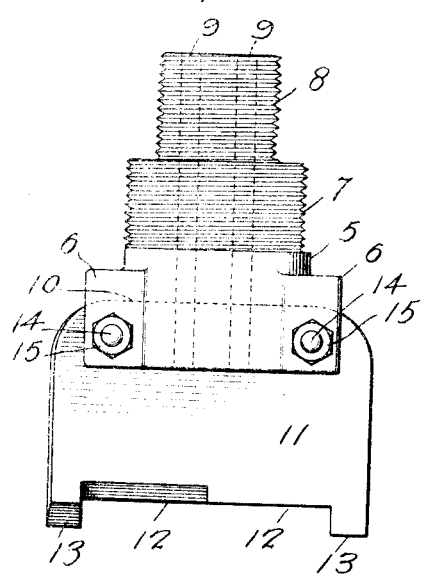
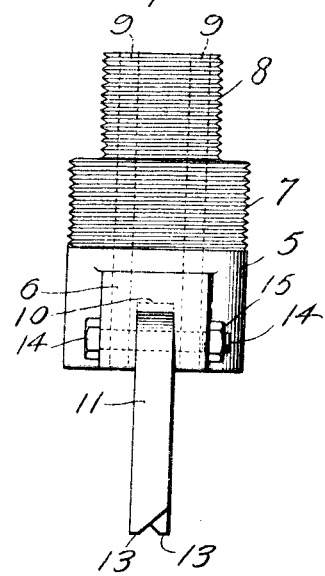
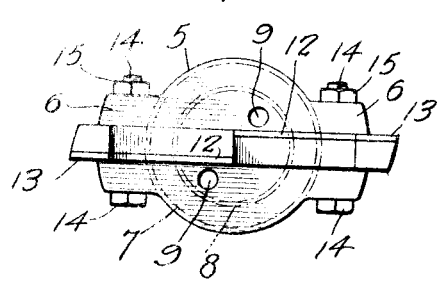
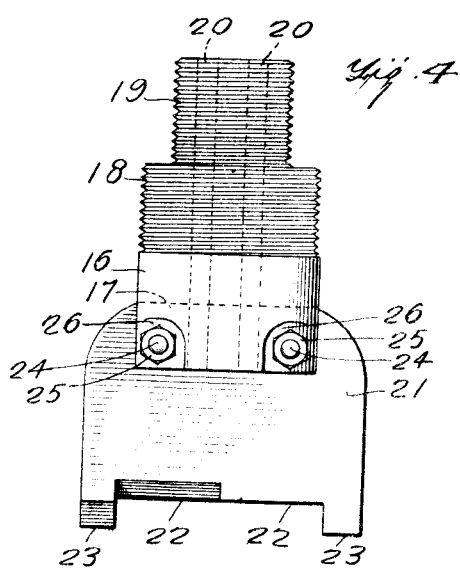
WITNESSES
L. H. Schmidt.
Walton Harrison
INVENTOR
FRED R. WEATHERSBY,
BY Munn & Co.
ATTORNEYS

UNITED STATES PATENT OFFICE.

FRED RICHARD WEATHERSBY, OF HOUSTON, TEXAS.

DRILL.

1,131,448. Specification of Letters Patent. Patented Mar. 9, 1915.

Application filed June 16, 1913. Serial No. 773,887.

*To all whom it may concern:*

Be it known that I, FRED R. WEATHERSBY, a citizen of the United States, and a resident of Houston, in the county of Harris and State of Texas, have made certain new and useful Improvements in Drills, of which the following is a specification.

My invention relates to drills and more particularly to drills of the type suitable for earth boring, my more particular purpose being to provide an improved drill having means for positively centering the drill before the main cutting edges thereof come into play so that the drill will be at all times guided in an accurate straight path.

Reference is made to the accompanying drawing forming a part of this specification, and in which like letters indicate like parts.

Figure 1 is a side elevation showing one form of my improved drill. Fig. 2 is a side elevation of the same. Fig. 3 is an inverted plan of the mechanism shown in Figs. 1 and 2. Fig. 4 is a front elevation of a slightly different form of my improved drill.

The drill shank is shown at 5 and is provided with a pair of lugs 6 integral with it and extending from it in opposite directions. The drill shank is provided with a threaded portion 7 of large diameter and with a reduced threaded portion 8. The drill shank is further provided with water holes 9 extending through it in a direction parallel with its general axis. The drill shank is also provided with a slot 10 which extends the full width of the drill shank including the lugs 6. A cutter 11 having generally the form of a flat plate is provided with cutting edges 12 and also with pilot blades 13, these parts being integral with the cutter. The cutter is fitted neatly into the slot 10. For the purpose of holding the cutter in position, I provide two bolts 14, each extending through the lugs 6 and also through holes in the cutter. Detachably fitted upon the bolts 14 are nuts 15. With this arrangement the lugs 6 brace the cutter and the bolts 14 not only hold the cutter but strengthen both the cutter and the lugs. If it should happen that the lugs 6 become cracked or otherwise injured, the bolts 14 are adapted to hold the parts in their approximate positions until the drill is withdrawn and the damage discovered. In order to remove the cutter, all that is necessary is to take off the nuts 15 and displace the bolts 14, the reverse operation being followed when the cutter is to be connected with the drill stem.

In the form shown in Fig. 4, the drill stem appears at 16 and is provided with a slot 17. The drill stem is further provided with a threaded portion 18 of large diameter and with a threaded portion 19 of reduced diameter. The drill stem here shown is provided with water holes 20 extending axially through it. The cutter appears at 21 and is provided with operating edges 22 and with pilot blades 23. Bolts 24 fitted with nuts 25 extend through the drill stem 16 and through holes in the cutter 21.

The drill stem 16 is provided with recesses 26 for holding the nuts or bolt heads. The form shown in Fig. 4 differs from that appearing in the other figures chiefly in the fact that the lugs 6 are not employed. The formation of the cutter used in either case is practically the same, and as shown provides the extensions or pilot blades 13 and 23 as shown in Figs. 1 and 4 respectively, at the ends of the horizontal cutting edges 12 and 22 respectively. These pilot blades or extensions are provided with cutting edges in a line below or to one side of the line of the main cutting edges, so that in operation the pilot blades first come into play so as to center the drill before the main cutting blades begin their action, and as the drilling process continues the drill will be guided and maintained in a straight and accurate path.

In both forms of my invention the drill stem is provided with threaded portions of reduced diameter. The purpose of this arrangement is to enable the drill stem to be connected with either a large pipe or a small pipe in order to supply the drill with water as the drill is turned. With my improved drill I can use, for instance, a four-inch water pipe or a six-inch water pipe without making any change whatever in the cutter, the bolts or any other part except the water pipe.

I do not limit myself to the precise construction shown as variations may be made therein without departing from the spirit of my invention.

I claim:—

A drill comprising a flat cutter having oppositely beveled straight cutting edges extending horizontally from the center toward the edges of the cutter, and extensions disposed at the outer ends of said horizontal cutting edges and at right angles thereto, said extensions depending below said horizontal edges and having oppositely disposed horizontal cutting edges in a line below the line of the first mentioned edges of the cutter.

FRED RICHARD WEATHERSBY.

Witnesses:
J. D. Long,
I. A. Lyons.